United States Patent [19]

Heidel

[11] Patent Number: 4,792,362

[45] Date of Patent: Dec. 20, 1988

[54] PROCESS FOR PRODUCING LOW-VISCOSITY STARCH DISPERSIONS

[75] Inventor: Klaus Heidel, Marl, Fed. Rep. of Germany

[73] Assignee: Huels Aktiengesellschaft, Marl, Fed. Rep. of Germany

[21] Appl. No.: 147,597

[22] Filed: Jan. 22, 1988

Related U.S. Application Data

[63] Continuation of Ser. No. 866,538, May 23, 1986, abandoned.

[30] Foreign Application Priority Data

May 23, 1985 [DE] Fed. Rep. of Germany ....... 3518464

[51] Int. Cl.$^4$ .................. C13L 1/08; C08B 30/00
[52] U.S. Cl. ........................ 127/71; 127/70; 127/65; 536/102; 426/661
[58] Field of Search .............. 127/71, 70, 65, 33; 536/102; 426/661

[56] References Cited

U.S. PATENT DOCUMENTS 2,689,255 12/1954 Kass .................................. 106/213
3,977,897 8/1976 Wurzburg et al. .................. 127/71
4,131,576 12/1978 Iovine et al. .

FOREIGN PATENT DOCUMENTS 863203   2/1971  Canada .................................. 127/70
2278705  7/1974  France .
45938   11/1972  Japan .
488672   7/1938  United Kingdom .

OTHER PUBLICATIONS

Ullmanns Encyclopedia, 4th Edition, vol. 22 (1982), pp. 173 and 174.
Encyclopedia of Polymer Science and Technology 12:822–23, 1970.
Tensid-Taschenbuch, 2ed., Staerke, p. 586, 1981.

*Primary Examiner*—H. M. S. Sneed
*Assistant Examiner*—Chung K. Pak
*Attorney, Agent, or Firm*—Millen & White

[57] ABSTRACT

The invention relates to a process for the production of low-viscosity, aqueous dispersions of gelatinized, starches, and to dispersions produced thereby. The viscosity is considerably reduced by adding a nonionic tenside from the group of unilaterally etherified polyoxyalkylene glycols, so that up to 50% strength, stirrable dispersions of gelatinized starch can be produced.

13 Claims, 5 Drawing Sheets

PROCESS FOR PRODUCING LOW-VISCOSITY STARCH DISPERSIONS

This application is a continuation of application Ser. No. 866,538, filed May 23, 1986, now abandoned.

BACKGROUND OF THE INVENTION

The invention relates to a process for producing low-viscosity, aqueous starch dispersions containing starch granules that are gelatinized but are unpasted, that is, do not become highly viscous.

An important technological property displayed by starch is its great swelling capacity. However, swelling is generally followed by coagulation into a starch paste. Swelling is brought about by heating, but also by an enzymatic treatment or by adding an alkali at room temperature.

Dispersions that do not form pastes under these conditions are needed in the case where starch is to be chemically modified by esterification, etherification, oxidation or by some other reaction. The high viscosity of typical starch pastes interferes with the chemical modification of the starch. Pastes having starch concentrations of 15% are, in part, no longer stirrable. Therefore, in order to provide adequate mixing with the reaction components, it is necessary to perform the reaction in a relatively high dilution.

Alternatively, by starting with a suspension of unswelled starch granules, the reaction can be conducted at a high starch concentration and low viscosity. In order to safely avoid pasting, however, a temperature of 50° C. must not be substantially exceeded in this process. Reactions in such heterogeneous systems, though, frequently proceed unsatisfactorily since the reaction takes place only on the surface of the solid, unswelled particles. Thus, only minor degress of substitution are achieved.

A number of processes are known for the preparation of thinly fluid starch pastes, but these require a considerable interference with the structure of starch. For example, by partial hydrolytic breakdown with the aid of acids, a thin-boling starch is otained (Ullmanns Encyklopaedie der Technischen Chemie 22: 192 [1982]), yielding thinly fluid pastes when boiled in water. However, the pastes undergo secondary thickening upon cooling.

For the production of swelling starches, aqueous starch suspensions are heated, in most cases on drum dryers, past the pasting temperature and, in this shape, disintegrated, pasted, and dried. Thus swelling starches, which are also called cold-water-soluble starches, form pastes with water at room temperature. For this reason, they are not suitable for chemical reactions.

Polyhydroxy compounds, such as glucose or sucrose, draw water from starch. Thus, when heating a starch suspension after adding sugar, a slowed-down gelatinization and a slightly lowered viscosity of the paste are observed (Encyclopedia of Polymer Science and Technology 12: 822 [1970]). Similar effects are also disclosed by B. J. Oosten (Staerke [Starch] 36: 18 [1984]). By addition of sorbitol or glycerol, the gelatinization temperature determined by means of a polarizing microscope is increased by up to 14° C. This temperature elevation is undesirable because starch reactions proceed incompletely below the gelatinizing temperature.

The gelatinizating temperature $T_{gel}$ is defined for the purposes of this disclosure as the temperature at which 50% of the starch granules have lost their birefringence (B. J. Oosten, Staerke, 36: 18 [1984]), which disclosure is incorporated by reference herein.

Pasting behavior is detected by measuring viscosity as a function of time and of temperature in the form of a so-called viscogram, wherein a starch slurry is heated at a certain velocity under agitation to a temperature of about 90° C., maintained at this temperature for a specific time period (for example 30 minutes), whereupon the starch paste is cooled at a specific rate. The pasting temperature, $T_{paste}$, is the temperature at which the dispersion, during heating, passes through a viscosity maximum (cf. Ullmanns Encyklopaedie der Technischen Chemie 22: 172 [1982]), which disclosure is incorporated by reference herein. During cooling of such a paste, the viscosity rises again and reaches a second maximum indicatiang relative solidity of the starch gel. The viscosity curves show a characteristic course for each type of starch. For example, pasting of potato starch leads to a relatively high viscosity of the paste which drops again greatly upon cooling. Cornstarch has a lower viscosity peak.

By heating an aqueous suspension of "native", i.e., naturally occurring strachm, gelatinization is immediately followed by coagulation into a starch paste. If it were possible to raise the pasting temperature once gelatinizing has occurred, then a temperature range would result within which a low-viscosity (i.e., unpasted), gelatinized starch dispersion would exist which would be readily suitable for chemical reactions.

According to O. Harbitz (Staerke 35: 198 [1983]), which disclosure is being incorporated by reference herein, addition of dodecanoic acid raises the pasting temperature by 2° C. In contrast thereto, by adding sodium dodecyl sulfate, an anionic tenside, the pasting temperature of potato starch is lowered.

According to Japanese Pat. No. 72-45,938, which disclosure is being incorporated by reference herein, cationic and nonionic tensides, such as, for example polypropylene glycol-polyethylene glycol ethers, also cause lowering of the pasting temperature and accelerate pasting. In one example, the pasting temperature is lowered by 7° C. by dodecyltrimethylammonium chloride.

Consequently, a person skilled in the art with the objective of producing low-viscosity dispersion of native starch that pastes only at an elevated temperature would expect that tensides would lower the pasting temperature and would be unsuitable additives in starch modification reactions.

SUMMARY OF THE INVENTION

It is an object of the invention to provide a process for the production of gelatinized, unpasted starch dispersions having low viscosities at high starch concentrations. It is an additional object to provide such gelatinized, unpasted dispersions, suitable for use in chemical reactions.

Upon further study of the specification and appended claims, further objects and advantages of this invention will become apparent to those skilled in the art.

These objects are achieved by providing low-viscosity dispersions of gelatinized, unpasted starch obtained by adding a unilaterally etherified polyoxyethylene glycol tenside of the formula $$R-(O-CH_2-CH_2)_n-OH \qquad (I)$$

wherein R is an alkyl or alkenyl residue of 6-20 carbon atoms and n is an integer from 3 to 30.

BRIEF DESCRIPTION OF THE DRAWINGS

Various other objects, features and attendant advantages of the present invention will be more fully appreciated as the same becomes better understood when considered in connection with the accompanying drawings, in which like reference characters designate the same or similar parts throughout the several views, and wherein.

DETAILED DISCUSSION

Figure 1:
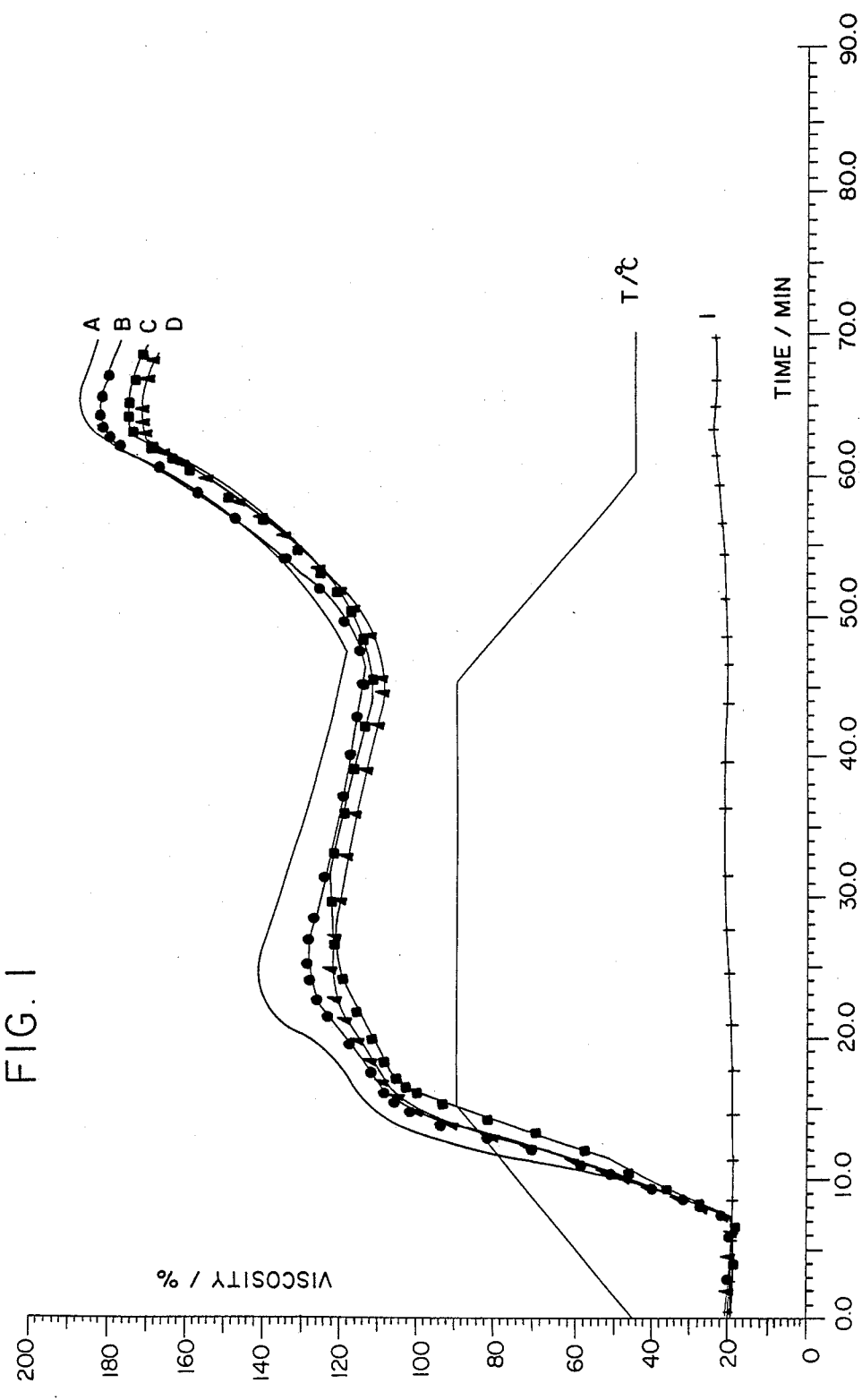
FIGS. 1-5 show time cures of the viscosity of several starch dispersions.

Native and slightly broken down starches are suitable for use in the starch dispersions of this invention. As slightly broken down starches are understood broken down starches and thin-boling starches according to Ullmanns Encyklopaedie der Technischen Chemie 22: 191, FIG. 31 (1982). In connection with the slightly broken down starches, acid-modified starches as well as starches modified by oxidation are suitable as described in Ullmans Encyklopaedie der Technischen Chemie 22: 192 (1982), which disclosure is being incorporated by reference herein. However, native starches, such as potato, corn wheat, rice, or tapioca starches, are preferred. Mixtures of any of the above starches may be used. Especially for dispersions of these high molecular weight native starches, a great viscosity reducing effect is achieved by this invention. It is possible to produce stirrable, highly concentrated dispersions with the slightly broken down, lower viscosity starches by using the nonionic tensides of Formula I.

In the tensides of Formula I, R is preferably an alkyl residue of 8-15 carbon atoms, more preferably 12-14 carbon atoms, and n is preferably an integer from 4-20. R can also be an alkenyl residue of 6-20 carbon atoms, wherein the number of double bonds is 1 or 2. The tensides are all per se known and generally commercially available. They are described in Staerke, Tensid-Taschenbuch, 2. Edition: 586 ff (1981), Carl-Hanser-Verlag. Mixtures of these tensides may be used too.

The nonionic tensides are utilized in concentrations of 0.1-10% by weight, preferably 1-5% by weight, based on the dry starch.

The tensides are added to the suspension of the starch granules in water at room temperature. The suspension is agitated and may be slightly heated up to about 40° C. The suspension contains starch granules in concentrations up to 50% by weight.

The samples are heated from 45° to 90° C. at a heating up rate of 3° C./min. The temperature is maintained at 90° C. for 30 minutes. Then the mixture is cooled to 45° C. at a cooling rate of −3° C./min. For $T_{gel}$ birefringence is determined under a microscope. For $T_{paste}$ the viscosity of the agitated mixture is measured.

It is possible by addition of the additives of this invention to raise the pasting temperature of starch whereas the gelatinization temperature remains unchanged. Typically, without intending to limit this invention, parting temperatures are generally raised by 5-30 centigrade degrees.

Up to 50% strength, stirrable dispersions of gelatinized, native starch can be produced. In this connection, 10-30% strength dispersions are of special industrial interest. In dispersions of higher concentrations, the starch granules become only partially gelatinized but are still useful.

The low-viscosity dispersions of gelatinized starch obtained after adding the tensides of Formula I are especially well suited for chemical reactions, such as esterification, etherification, oxidation and carboxymethylation reactions. Typical reactions are disclosed in Ullmanss Encyklopaedie der Technischen Chemie 22: 194-199 (1982). The startch or its reaction products can be isolated from dispersions produced according to the invention by simple centrifuging or by filtration and drying. The difficulties in working up pastes and solutions are avoided herein.

By addition of the compounds of Formula I, it is furthermore made possible to carry out starch fractionations from highly concentrated dispersions at elevated temperatures.

Without further elaboration, it is believed that one skilled in the art can, using the preceding description, utilize the present invention to its fullest extend. The following preferred specific embodiments are, therefore, to be construed as merely illustrative, and not limitative of the remainder of the disclosure in any way whatsoever.

In the preceding test and the following examples, all temperatures are set forth uncorrected in degrees Celsius and all parts and percentages are by weight; unless otherwise indicated. The preceding examples can be repeated with similar success by substituting the generically or specifically described reactants and/or operating conditions of this invention for those used in the preceding examples.

EXAMPLES

The examples set forth below are to describe the invention.

In Examples 1-7, the viscosity-lowering effect of the nonionic tensides of Formula I according to this invention is demonstrated on dilute starch dispersions. The results can also be applied to concentrated dispersions.

In Examples 8-20, the effects of the nonionic tensides on gelatinizing temperature $T_{gel}$ and the pasting temperature $T_{paste}$ are demonstrated on technically interesting, concentrated starch dispersions.

The examples of this invention are denoted by numbers; the comparative examples are denoted by letters.

EXAMPLES 1-4, COMPARATIVE EXAMPLES A-K

A starch solution of
98 parts of fully demineralized water,
2 parts of native potato starch (manufacturer: Fa. Emslandstaerke),
0.04 part of tenside (cf. Table 1)
is heated under agitation from 45° to 90° C. at a heating up rate of 3° C./min. The temperature is maintained at 90° C. for 30 minutes; then the suspension is cooled to 45° C. at a cooling rate of −3° C./min.

During the entire procedure, the viscosity of the dispersion is observed with the aid of a rotary viscometer of the type "RHEOMAT" 30 by Contraves.

Figure 2:
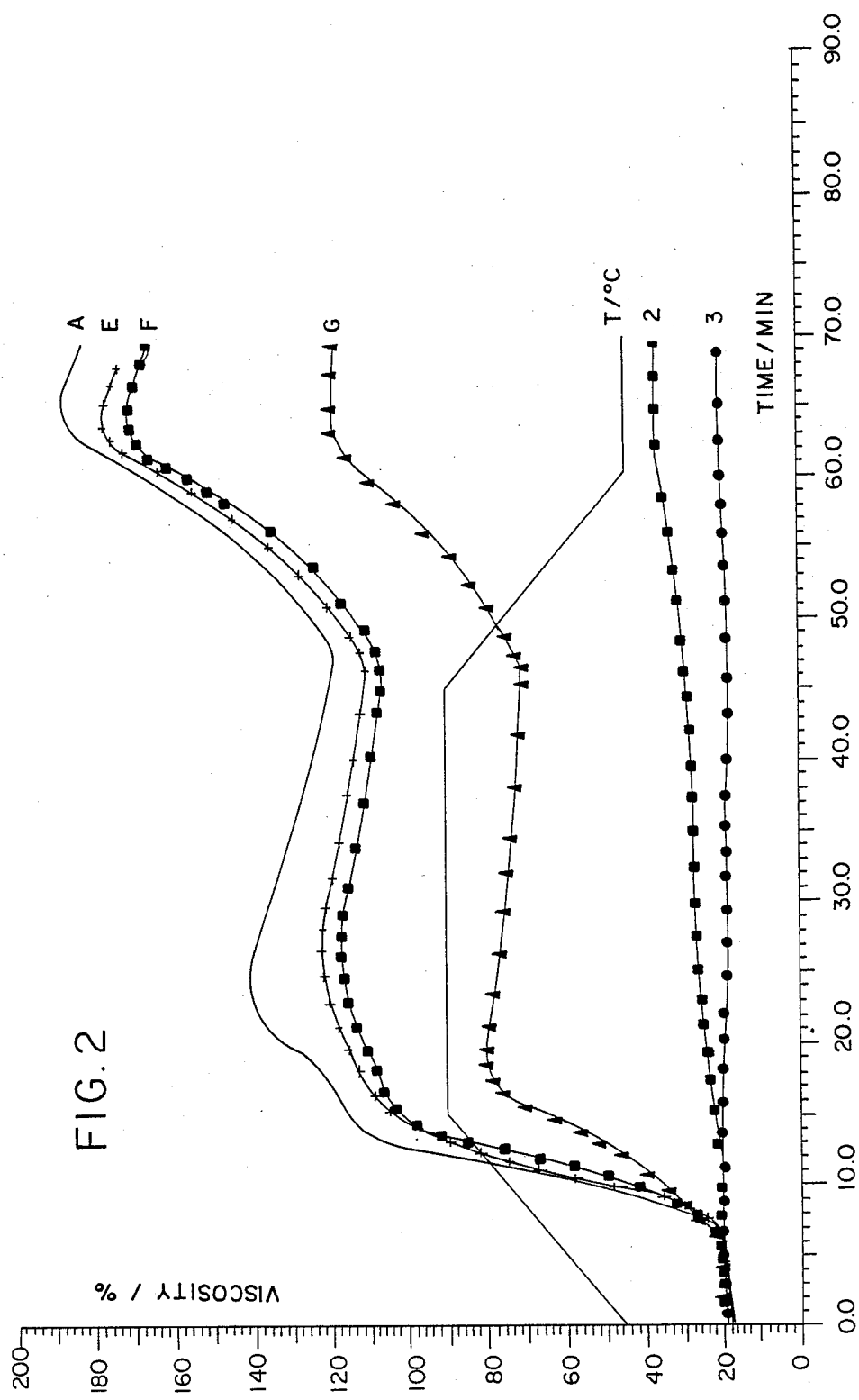
Figure 3:
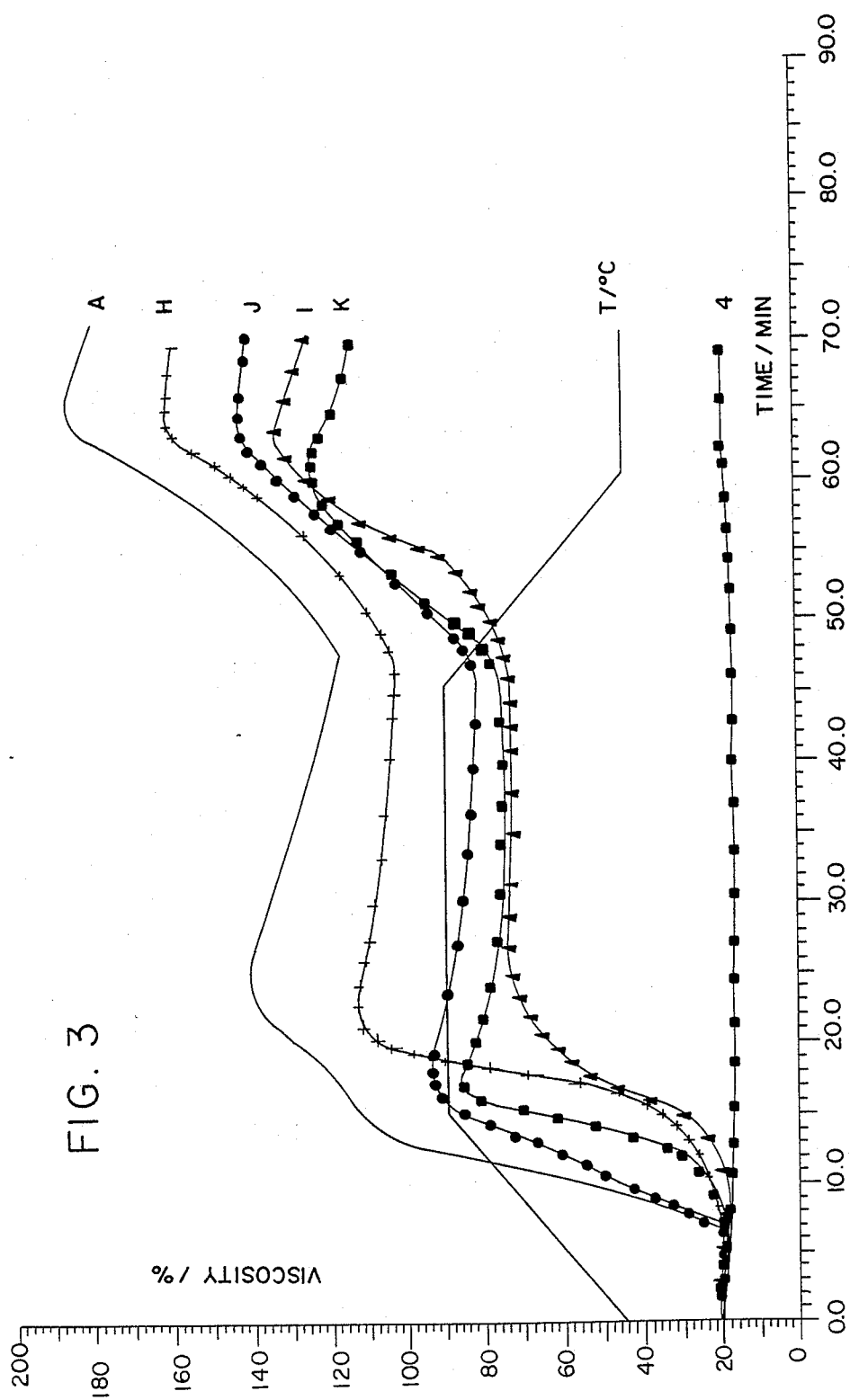

The tensides employed are compiled in Table 1. The chronological curve of the viscosity of the starch dispersions with these tensides is represented in FIGS. 1 through 3.

TABLE 1

| Example | Tenside |
|---|---|
| A | — |
| B | $H-(OCH_2CH_2)_8-OH$ |
| C | $H-(OCH_2CH_2)_{35}-OH$ |
| D | $H-(OCH_2CH_2)_{135}-OH$ |
| 1 | $C_{13}H_{27}-(OCH_2CH_2)_{19}-OH$, "MARLIPAL" 1219, Huls AG, D-4370 Marl |
| E | Polyvinyl acetate, saponified to an extent of 88 mol-%, "POVAL" 220, Kuraray, Okayama, Japan |
| F | Polyvinyl acetate, saponified to an extent of 71 mol-%, "MOWILITH" DM 5/290, Hoechst AG, D-6230 Frankfurt |
| G | $C_9H_{19}-C_6H_4-(OCH_2CH_2)_8-O-SO_3Na$, "SERDET" DNK 15/35, Servo, Delden, Netherlands |
| 2 | $C_{17}H_{35}-(OCH_2CH_2)_{19}-OH$, "MARLIPAL" SU |
| 3 | $C_{12}H_{25}-(OCH_2CH_2)_7-OH$, "MARLIPAL" MG |
| H | Sorbitan polyethylene glycol ether dodecanoic acid ester, "TWEEN" 20, Atlas, Wilmington, Delaware, USA |
| I | Sorbitan polyethylene glycol ether, "SPAN" 20, Atlas, Wilmington, Delaware, USA |
| J | Sodium Dodecylbenzenesulfonate, "MARLON" A 350, Huls AG, D-4370 Marl |
| K | $C_{12}H_{25}-SO_3Na$ |
| 4 | $C_{12}H_{25}-(OCH_2CH_2)_4-OH$, "MARLIPAL" 124 |

For Table 1 as well as following Tables 2 and 3, the rule applies that, in the formulae, the indices giving the number of oxyethylene units are in each case average values.

EXAMPLES 5-7, COMPARATIVE EXAMPLES L-O

Figure 4:
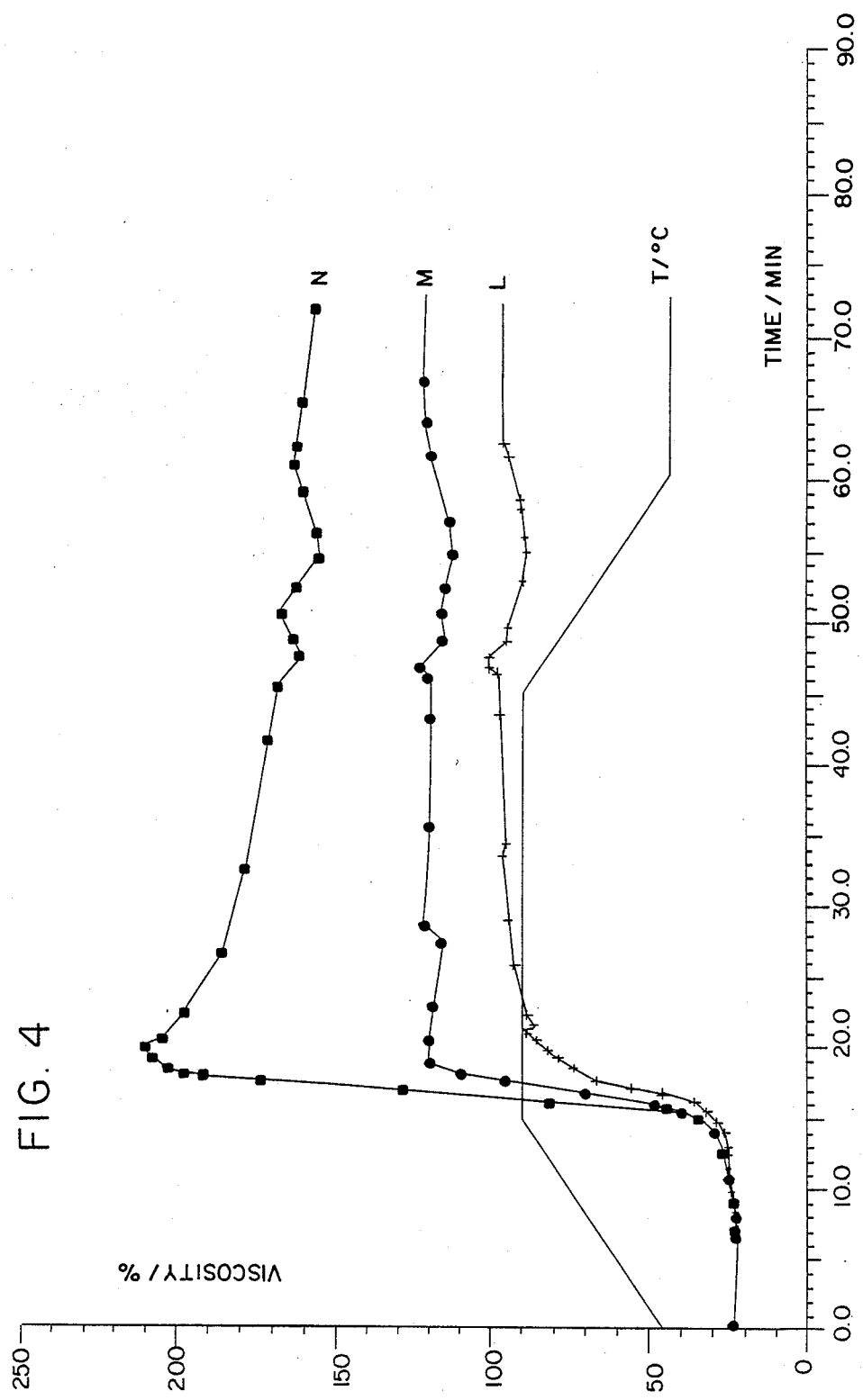
Figure 5:
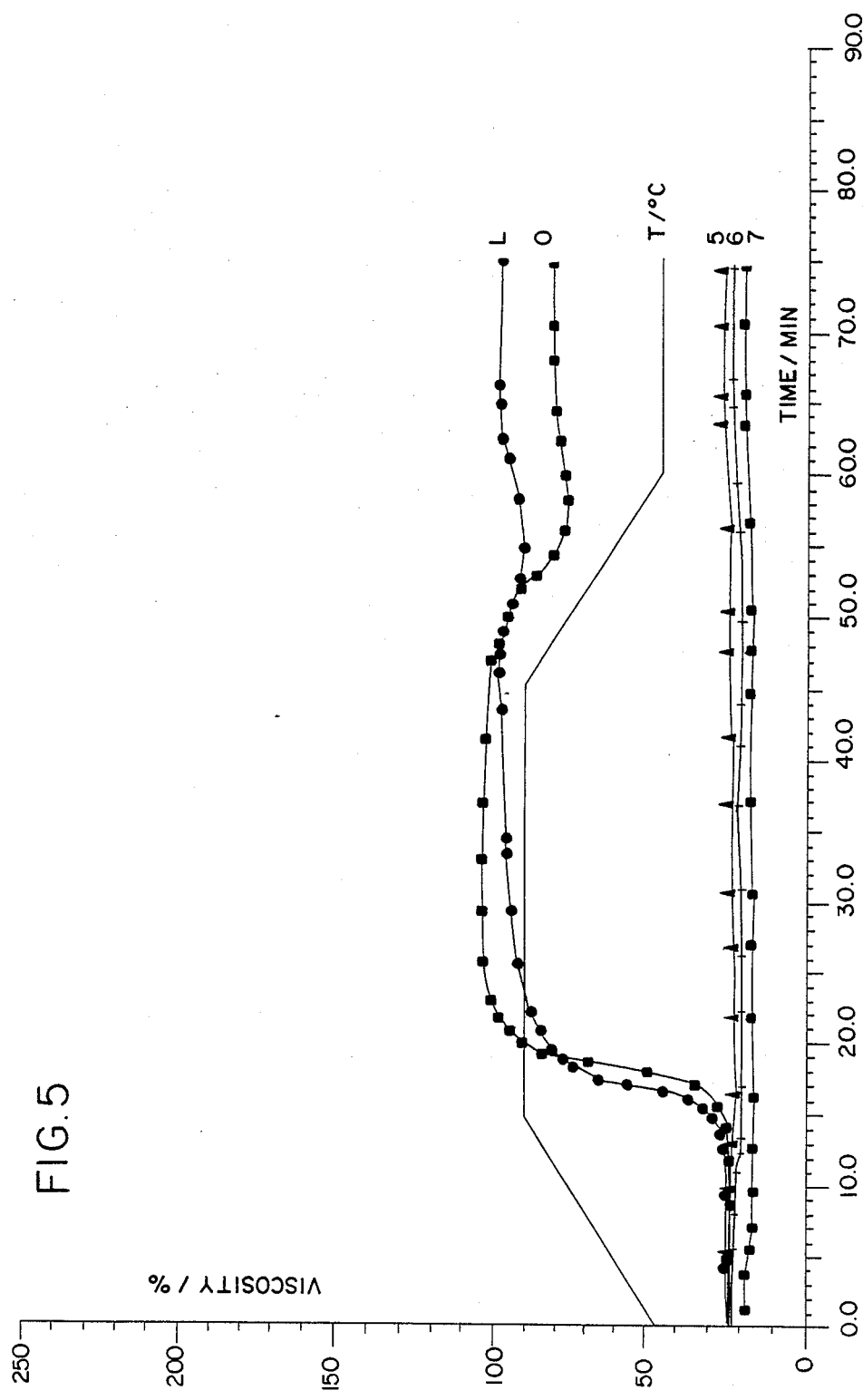

The process described in Examples 1-4 is carried out with a starch suspension of
96 parts of fully demineralized water,
4 parts of native cornstarch (manufacturer: Fa. Maizena),
0.08 part of tenside (cf. Table 2).
The tensides employed are compiled in Table 2. The viscosity curve of the starch dispersions is illustated in FIGS. 4 and 5.

TABLE 2

| Example | Tenside |
|---|---|
| L | — |
| M | Sodium dodecylbenzenesulfonate |
| N | $C_{12}H_{25}-SO_3Na$ |
| O | Sorbitan polyethylene glycol ether dodecanoic acid ester |
| 5 | $C_{12}H_{25}-(OCH_2CH_2)_4-OH$ |
| 6 | $C_{12}H_{25}-(OCH_2CH_2)_7-OH$ |
| 7 | $C_{12}H_{25}-(OCH_2CH_2)_{17}-OH$, "MARLIPAL" 1217 |

EXAMPLES 8-20, COMPARATIVE EXAMPLES P-R

A nonionic tenside is added to a 10% and, respectively, higher-percentage suspension of a native starch in a one-liter agitated flask. Subsequently, the suspension is heated up under agitation from 45° to 95° C. with a heating rate of 3° C./min. The $T_{gel}$ is determined on samples under a polarizing microscope.

Determination of $T_{paste}$ takes place with a good approximation to the actual value by detecting the beginning and the end of the pasting process and calculating therefrom the average temperature value. The beginning of pasting is characterized by a strong increase in viscosity and the disappearance of the agitation funnel. At the end of the pasting process, a homogeneous mass has been formed, and the agitator comes to a standstill or agitates without moving the mass outside of its reach.

TABLE 3

| Example | % Starch Based on Dispersion | Starch | % Tenside Based on Starch | Tenside | $T_{gel}$ °C. | $T_{paste}$ °C. |
|---|---|---|---|---|---|---|
| P | 10 | Native | — | $C_{12}H_{25}-(OCH_2CH_2)_7-OH$ | 66 | 80 |
| 8 | 10 | Corn- | 2 | | 66 | 90 |
| 9 | 10 | starch | 4 | | 66 | >95 |
| 10 | 10 | | 10 | | 66 | >95 |
| Q | 10 | Native | — | $C_{12}H_{25}(OCH_2CH_2)_4-OH$ | 65 | 75 |
| 11 | 10 | Potato | 2 | | 64 | 85 |
| 12 | 10 | Starch | 4 | | 65 | 91 |
| 13 | 10 | | 10 | | 65 | >95 |
| R | 10 | Native | — | $C_{12}H_{25}-(OCH_2CH_2)_{17}-OH$ | 59 | 75 |
| 14 | 10 | Wheat | 2 | | 59 | 92 |
| 15 | 10 | Starch | 4 | | 59 | >95 |
| 16 | 10 | | 10 | | 60 | >95 |
| 17 | 20 | Native | 5 | $C_{12}H_{25}-(OCH_2CH_2)_{17}-OH$ | 67 | >95 |
| 18 | 20 | Corn- | 10 | | 67 | >95 |
| 19 | 30 | starch | 5 | | 67 | >95 |
| 20 | 30 | | 10 | | 67 | >95 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for producing an aqueous starch dispersion comprising mixing starch and water to form a mixture of water and discrete unpasted, gelatinized starch granules, and heating and homogenizing the resultant mixture, the improvement comprising adding to the mixture a tenside of the formula $$R-(O-CH_2-CH_2)_n-OH$$

wherein R is alkyl or alkenyl of 6-20 carbon atoms, and n is 3 to 30,
in an amount whereby the temperature at which the mixture otherwise pastes is increased.

2. A process according to claim 1, wherein the amount of the tenside added is 0.1-10 wt% based on the amount of starch.

3. A process according to claim 1, wherein the amount of the tenside added is 0.5-5 wt% based on the amount of starch.

4. A process according to claim 1, wherein R is alkyl of 8-15 carbon atoms and n is 4 to 20.

5. A process according to claim 1, wherein the starch is a native starch.

6. A process according to claim 5, wherein the starch is a potato starch, a cornstarch, a wheat starch, a rice starch, a tapioca starch or a mixture thereof.

7. A process of claim 1 wherein the starch is acid or oxidation modified.

8. A process of claim 1 wherein n is 4-20.

9. A process of claim 1 wherein R is alkyl of 12-14 carbon atoms.

10. A process according to claim 1, wherein said mixture contains up to 50% by weight starch.

11. A process according to claim 4, wherein R is alkyl of 12-14 carbon atoms.

12. A method of raising the temperature at which an aqueous starch dispersion pastes, comprising adding to an unpasted aqueous starch dispersion an amount of a tenside of the formula $$R-(O-CH_2-CH_2)_n-OH$$

wherein R is alkyl or alkenyl of 6-20 carbon atoms, and n is 3 to 30,
effective to raise the pasting temprature of the dispersion.

13. In a process for the preparation of an unpasted aqueous starch dispersion for subsequent chemical modification, said process comprising mixing starch in water to form a mixture and heating and homogenizing the resultant mixture, the improvement wherein a tenside of a formula $$R-(O-CH_2-CH_2)_n-OH$$

wherein R is alkyl of 8-15 carbon atoms, and n is 3-30,
is added to the mixture in an amount effective to increase the temperature at which the mixture will paste.

* * * * *